(12) United States Patent
Hattori et al.

(10) Patent No.: US 10,707,709 B2
(45) Date of Patent: Jul. 7, 2020

(54) ROTOR HAVING MAGNETS SECURED WITH PLATES AND INSULATION IN MAGNET HOLES

(71) Applicant: Toyota Jidosha Kabushiki Kaisha, Toyota-shi, Aichi-ken (JP)

(72) Inventors: Hiroyuki Hattori, Okazaki (JP); Ken Noda, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/209,305

(22) Filed: Dec. 4, 2018

(65) Prior Publication Data

US 2019/0199148 A1 Jun. 27, 2019

(30) Foreign Application Priority Data

Dec. 26, 2017 (JP) .................................. 2017-248890

(51) Int. Cl.
*H02K 1/27* (2006.01)
*H02K 1/28* (2006.01)
*H02K 1/04* (2006.01)
*H02K 15/03* (2006.01)
*H02K 21/14* (2006.01)
*H02K 1/22* (2006.01)

(52) U.S. Cl.
CPC ............... *H02K 1/276* (2013.01); *H02K 1/04* (2013.01); *H02K 1/2766* (2013.01); *H02K 1/28* (2013.01); *H02K 15/03* (2013.01); *H02K 1/22* (2013.01); *H02K 1/274* (2013.01); *H02K 1/2773* (2013.01); *H02K 21/14* (2013.01)

(58) Field of Classification Search
CPC ........ H02K 1/04; H02K 1/276; H02K 1/2766; H02K 1/28; H02K 15/03; H02K 21/14
USPC .......................... 310/156.56, 156.57, 156.68
See application file for complete search history.

(56) References Cited

U.S. PATENT DOCUMENTS

| | | | |
|---|---|---|---|
| 2015/0236558 A1* | 8/2015 | Oketani | H02K 1/28 310/43 |
| 2016/0359384 A1* | 12/2016 | Okamoto | H02K 1/276 |
| 2017/0012510 A1* | 1/2017 | Hattori | H02K 1/27 |
| 2017/0302141 A1* | 10/2017 | Yokota | H02K 15/12 |
| 2018/0183305 A1* | 6/2018 | Kino | H02K 1/28 |

FOREIGN PATENT DOCUMENTS

| | | |
|---|---|---|
| EA | 014728 B1 | 2/2011 |
| JP | 2005-020819 A | 1/2005 |
| JP | 2010016961 A | 1/2010 |
| JP | 2015-061328 A | 3/2015 |
| JP | 2017-077086 A | 4/2017 |
| RU | 2558661 C2 | 8/2015 |

* cited by examiner

*Primary Examiner* — Tulsidas C Patel
*Assistant Examiner* — Rashad H Johnson
(74) *Attorney, Agent, or Firm* — Dinsmore & Shohl LLP

(57) ABSTRACT

A rotor includes a rotor core that is formed by stacking a plurality of steel plates each of which has an opening; a magnet that is inserted in a magnet hole formed by disposing the openings such that the openings overlap each other; and a magnetic plate that is disposed between an inner wall defining the magnet hole and the magnet so as to prevent contact between the inner wall defining the magnet hole and the magnet. At least a contact portion of the magnetic plate is subjected to an insulating process, the contact portion of the magnetic plate contacting the magnet.

6 Claims, 6 Drawing Sheets

ROTOR HAVING MAGNETS SECURED WITH PLATES AND INSULATION IN MAGNET HOLES

CROSS-REFERENCE TO RELATED APPLICATIONS

This application claims priority to Japanese Patent Application No. 2017-248890 filed on Dec. 26, 2017, which is incorporated herein by reference in its entirety including the specification, drawings and abstract.

BACKGROUND

1. Technical Field

The disclosure relates to a rotor in which a magnet is inserted in a magnet hole of a rotor core.

2. Description of Related Art

In a permanent magnet rotary electric machine, a rotor core is provided with a magnet hole, and a magnet is inserted in the magnet hole. Thus, magnetic poles are formed in a rotor.

In Japanese Patent Application Publication No. 2010-016961 (JP 2010-016961 A), it is described that, after a magnet in a flat plate shape is inserted in a magnet hole of a rotor core and a clearance between a magnet hole inner wall and the magnet is filled with magnetically conductive metal powder such as iron, contacts of the metal powder are welded by heating. In this way, magnetic resistance due to the clearance of the magnet hole or the like is lowered.

SUMMARY

In JP 2010-016961 A described above, contact between the magnet and the metal powder is not particularly mentioned.

In the rotary electric machine of a magnet type, loss of electric energy is reduced by reducing an eddy current. For example, the loss of the electric energy is reduced by coating a surface of the magnet with an insulating film so as to secure insulation between the magnet and the rotor core and to reduce the size of an eddy loop. However, in this case, cost of the insulating film is caused. In the case where the rotor core is formed by stacking electromagnetic steel plates, in a process of inserting the magnet in the magnet hole, the insulating film may be damaged by an uneven portion of the rotor core, and thus, the insulation may be damaged.

The disclosure provides a novel structure capable of securing insulation between a magnet and a rotor core in a permanent magnet rotary electric machine.

A rotor according to an aspect of the disclosure includes a rotor core that is formed by stacking a plurality of steel plates each of which has an opening; a magnet that is inserted in a magnet hole formed by disposing the openings such that the openings overlap each other; and a magnetic plate that is disposed between an inner wall defining the magnet hole and the magnet so as to prevent contact between the inner wall defining the magnet hole and the magnet. At least a contact portion of the magnetic plate is subjected to an insulating process, the contact portion of the magnetic plate contacting the magnet.

The rotor is a component of a permanent magnetic rotary electric machine. The rotor includes the rotor core, a shaft, and the like, and is rotated with the use of the shaft as a rotary shaft. The rotor core is provided with the magnet hole, and the magnet is inserted in the magnet hole. A magnetic force is exerted between the rotor core and a stator disposed around the rotor core. Thus, rotation of the rotor is accelerated or decelerated. The rotor core is formed by stacking the plurality of steel plates, and the magnet hole is formed by disposing the openings provided in the steel plates such that the openings overlap each other.

The magnetic plate is disposed between the magnet, which is inserted in the magnet hole, and the inner wall defining the magnet hole. The magnetic plate is a plate-shaped member with high magnetic permeability. A surface shape of the magnetic plate is not particularly limited. For example, a non-curved flat plate (whose curvature is equal to or close to zero), a plate having curved surfaces, a plate that has a portion bent perpendicularly, or the like can be used. In addition, a contour of the magnetic plate may have any of various shapes such as square, circular, oval, or free-curved shapes. Furthermore, the magnetic plate may have a shape provided with an opening. The magnetic plate prevents the magnet from contacting the inner wall defining the magnet hole. For example, the magnetic plate may be disposed to cover an entire periphery of the magnet or may be disposed only in a portion(s) where the magnetic plate needs to be disposed to prevent the contact between the magnet and the magnet hole. In the case where only one or some of the surfaces of the magnet are covered with the magnetic plates, each of the surface(s) may have a magnetic pole or may not have the magnetic pole. As the magnetic plate that covers all of the surfaces of the magnet, the single plate that is subjected to a bending process can be used, for example. For example, the magnetic plates provided on surfaces of the magnet may differ from each other. Furthermore, the magnetic plate that covers a surface may be formed by a plurality of small magnetic plates.

The contact portion of the magnetic plate that contacts the magnet is subjected to the insulating process. For example, the insulating process can be performed by coating the contact portion of the magnetic plate with resin having an insulation property. Alternatively, the contact portion of the magnetic plate can be insulated with the use of a chemical reaction such as oxidization of a surface thereof. The insulating process for the magnetic plate is performed on at least the contact portion of the magnetic plate, the contact portion of the magnetic plate contacting the magnet. The insulating process for the magnetic plate may be performed on an entire surface that contacts the magnet and may not be performed on a surface that does not contact the magnet. In this case, there is a possibility that the magnetic plate is electrically connected to the plurality of steel plates of the rotor core. However, an influence on loss of electric energy is small. In addition, the insulating process for the magnetic plate may be performed on both of the surface that contacts the magnet and the surface that does not contact the magnet. Furthermore, the insulating process for the magnetic plate may be performed on all of the surfaces including ends.

In the aspect of the disclosure, at least a surface of the magnet may have electrical conductivity. The inside and the surface of the magnet may have electrical conductivity. In the case where the surface of the magnet is subjected to the insulating process, the surface of the magnet loses its electrical conductivity and exhibits the insulation property. Even in the case where the surface of the magnet has electrical conductivity, due to the insulating process performed on the magnetic plate, the insulation between the magnet and the rotor core is secured.

In the aspect of the disclosure, the magnetic plate may be joined to the magnet. The magnetic plate can be joined to the magnet with the use of an adhesive, for example. The magnetic plate may be fastened to the magnet with the use of a fastening member that is separately provided. Timing at which the magnetic plate is joined to the magnet may be timing before or after the insertion of the magnet and the magnetic plate in the magnet hole. Relative positions of the magnet and the magnetic plate are determined by joining the magnet and the magnetic plate. Thus, insulation can be easily secured. In the case where the magnetic plate is fastened to the magnet at the timing before the insertion of the magnet and the magnetic plate in the magnet hole, the magnet and the magnetic plate can be promptly inserted in the magnet hole in a state where a desired positional relationship between the magnet and the magnetic plate is maintained. Therefore, it is expected that an assembly process can be performed more easily.

In the aspect of the disclosure, the magnet may include a plurality of small magnets combined with each other, and the plurality of small magnets may be joined to the magnetic plate.

In the aspect of the disclosure, the magnetic plate that is disposed on a surface of the magnet may include a plurality of small magnetic plates disposed such that the plurality of small magnetic plates do not overlap each other; and the plurality of small magnetic plates may be joined to the magnet.

In the aspect of the disclosure, each of the magnet and the magnet hole may have a rectangular parallelepiped shape; and the magnetic plate that is disposed on a surface of the magnet may extend outward from a width of the magnet. Here, the width of the magnet signifies a range in which the magnet extends in a direction orthogonal to a direction in which the magnet is inserted. Since the magnetic plate extends outward from the width range of the magnet, it is possible to prevent the contact between the magnet and the magnet hole on the side(s) toward which the magnetic plate extends.

According to the aspect of the disclosure, the magnetic plate prevents electrical connection between the magnet, which is inserted in the magnet hole, and the magnet hole. Although there is a possibility that the surface of the magnetic plate may be damaged by unevenness of the magnet hole during the insertion or the like, the magnet and the magnetic plate are reliably insulated from each other. Thus, as a whole, the magnet and the rotor core are insulated from each other. Therefore, the eddy current that flows between the magnet and the rotor core is not generated, and the loss of the electric energy due to the magnet can be reduced.

For example, even in the case where the magnet itself is not subjected to the insulating process, the magnet and the rotor core can be reliably insulated from each other. In the case where the magnet is not subjected to the insulating process, cost can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be provided on embodiments with reference to the drawings. In order to facilitate understanding of the description, specific embodiments will be provided. However, these specific embodiments are merely example embodiments, and various other embodiments can also be implemented.

Figure 1:
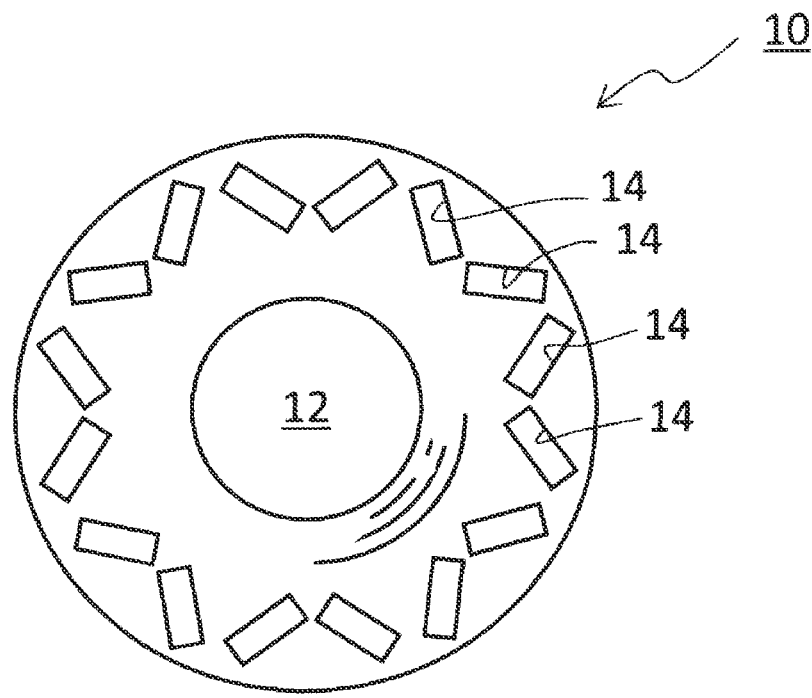
FIG. 1 is a top view illustrating a rotor core in an embodiment.

FIG. 1 is a top view of a rotor core 10 according to a first embodiment. The rotor core 10 is a cylindrical component that is formed by stacking a large number of thin electromagnetic steel plates, each of which is stamped into a ring shape (i.e., an annular shape). Each of the electromagnetic steel plates is provided with a plurality of openings, and the electromagnetic steel plates are stacked such that these openings overlap each other. In this way, through-holes, each of which extends through the plurality of electromagnetic steel plates, are formed. The through-hole that is provided at a center of the rotor core 10 is a shaft hole 12. The shaft hole 12 is a hole in which a shaft as a rotary shaft is inserted. A rotor is formed as a whole by fixing the shaft, which is inserted in the shaft hole 12, and the rotor core 10.

Each of the sixteen through-holes provided near an outer periphery of the rotor core 10 is a magnet hole 14 in which a permanent magnet (will also be simply referred to as a magnet) is inserted. When the magnets are regularly inserted in the magnet holes 14, a plurality of magnetic poles are formed in the rotor core 10. Due to interaction between each of these magnetic poles and a stator that is disposed around the rotor, rotation of the rotor is controlled. In general, a rotary electric machine in which the magnets are installed in the rotor is referred to as a permanent magnet rotary electric machine.

Figure 2:
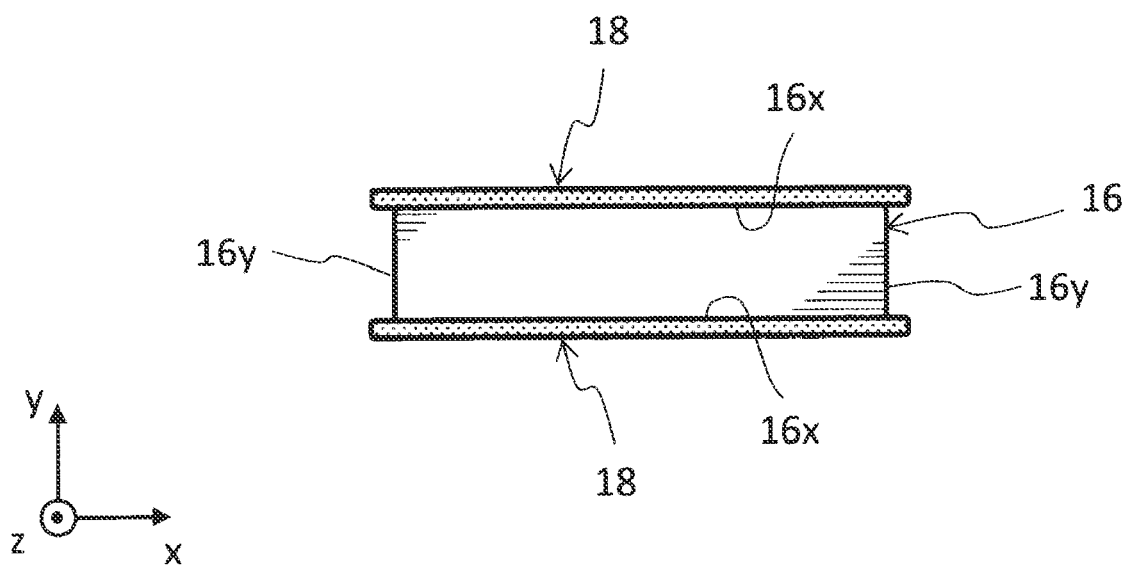
FIG. 2 is a top view illustrating a state where a magnet and electromagnetic steel plates are joined to each other.
Figure 3:
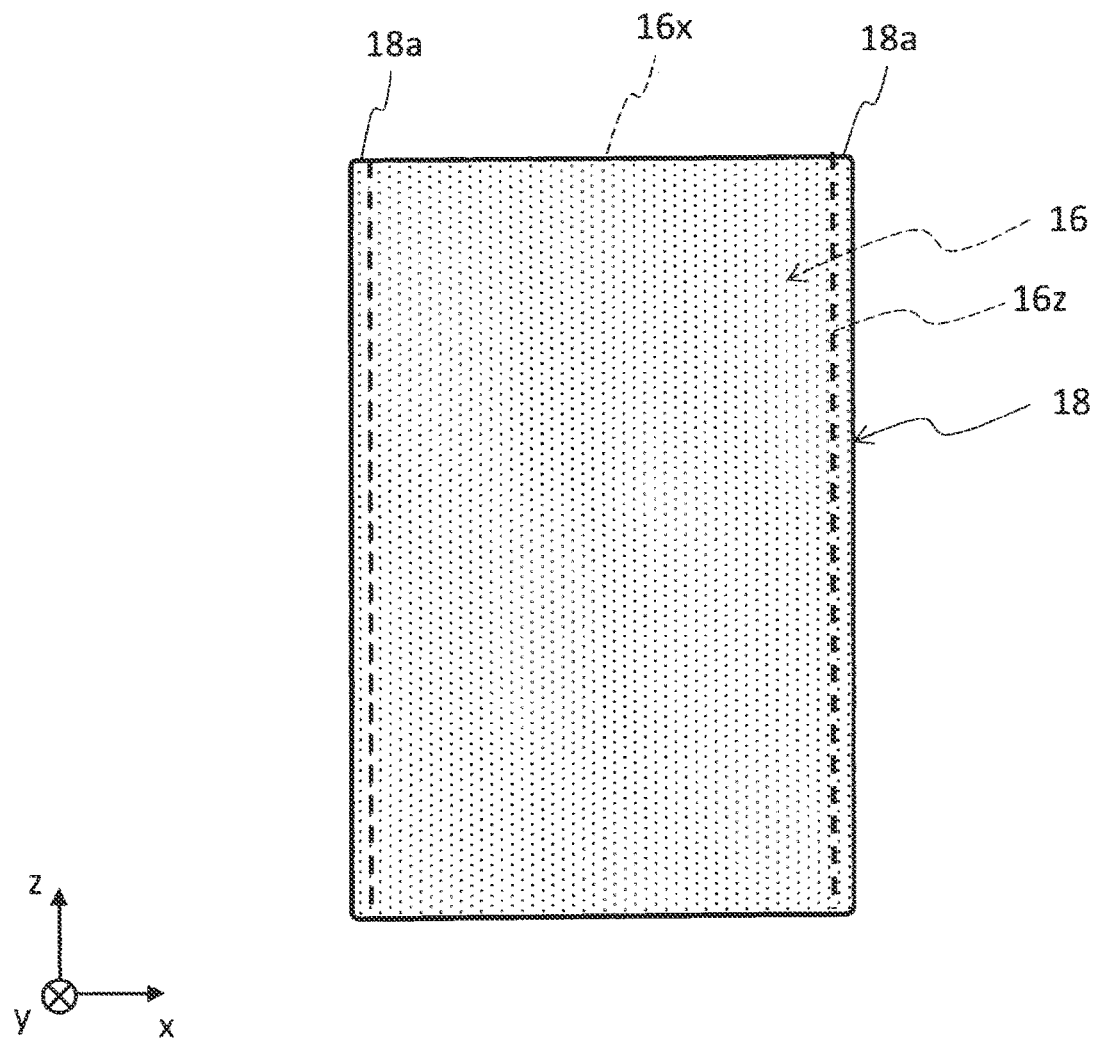
FIG. 3 is a side view illustrating the state where the magnet and the electromagnetic steel plate are joined to each other.

Next, a description will be provided on magnets 16 that are inserted in the magnet holes 14 with reference to FIG. 2 and FIG. 3. FIG. 2 is a top view illustrating the magnet 16 that is seen from above the magnet hole 14, and FIG. 3 is a side view of the magnet 16. For the sake of convenience, (x, y, z) orthogonal coordinates are illustrated in FIG. 2 and FIG. 3. A z-direction is a direction in which the magnet hole 14 extends through the rotor core 10, and the z-direction matches a direction in which the shaft extends, that is, a direction in which the rotary shaft extends. Each of an x-direction and a y-direction is an in-plane direction of each of the electromagnetic steel plates that constitute the rotor core 10. A direction in which a long side of the magnet 16 extends is set as the x-direction, and a direction in which a short side of the magnet 16 extends is set as the y-direction. The magnet 16 is formed to have a flat rectangular parallelepiped shape that has the longest side 16z in the z-direction, the second longest side 16x in the x-direction, and a short side 16y in the y-direction. The length of each of these sides corresponds to a shape of the magnet hole 14. The shapes, the number, and size of the magnets 16 and the magnet holes 14 can be set variously in accordance with desired performance of the rotary electric machine. Here, at least the length of the shortest side 16y of the magnet 16 is set to be greater than the thickness of an ordinary electromagnetic steel plate, and at least the length of the shortest side 16y may be set to be equal to or greater than five times or ten times the thickness of the ordinary electromagnetic steel plate.

The magnet 16 is formed by magnetizing a highly coercive magnet material. More specifically, the magnet material is magnetized in one direction such that, among six surfaces constituting the rectangular parallelepiped magnet 16, one of two surfaces defined by the sides 16x and the sides 16z has an N pole, and the other of the two surfaces has an S pole. The magnet 16 has electrical conductivity, and is not subjected to an insulating process of, for example, coating the magnet with an insulating film.

An electromagnetic steel plate 18 is bonded to each of the two surfaces having the magnetic poles in the magnet 16 with the use of an adhesive. The electromagnetic steel plate 18 is formed such that the length thereof in the z-direction is substantially equal to the side 16z of the magnet 16 and the width thereof in the x-direction is greater than the side 16x of the magnet 16. That is, the electromagnetic steel plate 18 includes projected portions 18a that respectively extend outward from both ends of the side 16x of the magnet 16. In other words, the projected portions 18a are respectively provided outside both ends of the side 16x of the magnet 16 and extend in the z-direction.

Figure 4:
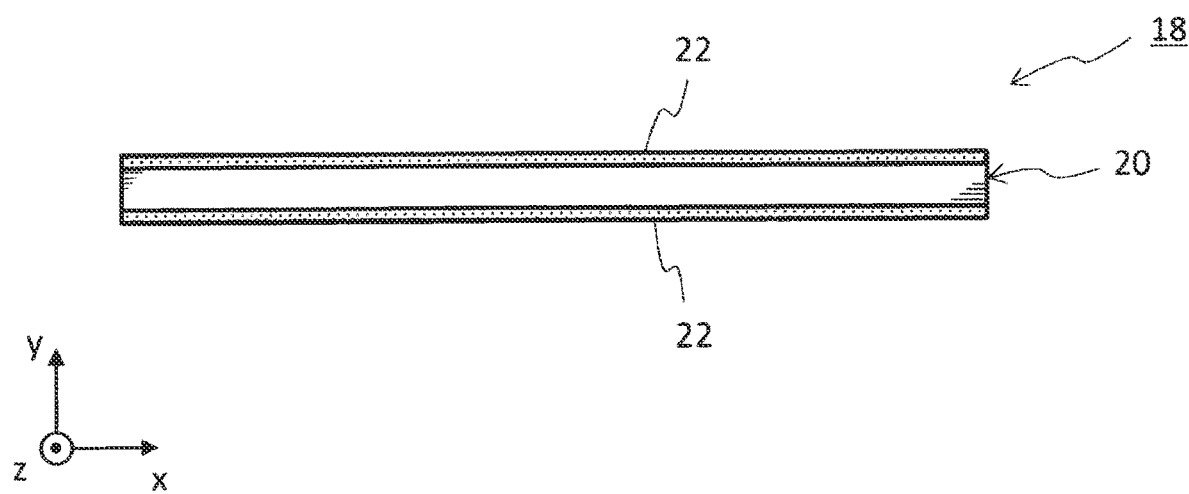
FIG. 4 is a top view illustrating a manner in which the electromagnetic steel plate is insulated.

FIG. 4 is a view illustrating the electromagnetic steel plate 18. FIG. 4 is a top view illustrating the single electromagnetic steel plate 18 that is seen in the same direction as in FIG. 2. However, in order to facilitate understanding of the description, FIG. 4 is enlarged in the y-direction. The electromagnetic steel plate 18 is a member that is subjected to the insulating process. That is, in the electromagnetic steel plate 18, each of surfaces of a highly permeable magnetic body 20 having a plate shape such as a silicon steel plate is coated with an insulating film 22, the surfaces being opposite surfaces in the y-direction. In general, the electromagnetic steel plate 18 is formed to be thin in order to suppress an eddy current. In many cases, the thickness of the electromagnetic steel plate 18 is equal to or less than 2 mm or equal to or less than 1 mm. The electromagnetic steel plates 18 whose thickness is equal to or less than 0.5 mm, equal to or less than 0.3 mm, equal to or less than 0.1 mm, and equal to or less than 0.05 mm are also known. In FIG. 4, for convenience of the description, the insulating film 22 is illustrated to be thick. In reality, the insulating film 22 is formed to be extremely thin within such a range that a required insulation property and required durability can be secured. The thickness, material, magnetic characteristic, and the like of the electromagnetic steel plate 18 that is bonded to the magnet 16 may be the same as, or different from those of each of the electromagnetic steel plates stacked in the rotor core 10.

Figure 5:
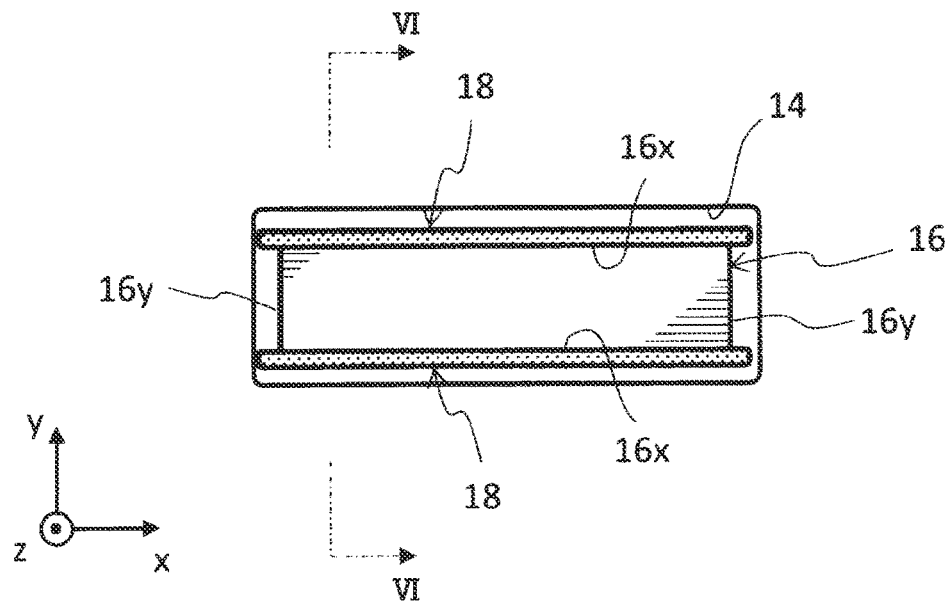
FIG. 5 is a top view illustrating a state where the magnet and the electromagnetic steel plates are inserted in a magnet hole.

FIG. 5 is a top view illustrating a state where the magnet 16, to which the electromagnetic steel plates 18 are bonded, is inserted in the magnet hole 14 of the rotor core 10. The length of the magnet hole 14 in the x-direction is slightly longer than the length of the electromagnetic steel plate 18 in the x-direction. The length of the magnet hole 14 in the y-direction is longer than the total length of the magnet 16 and the electromagnetic steel plates 18 in the y-direction with a slight margin being provided. The magnet 16 and the electromagnetic steel plates 18 are inserted in the magnet hole 14 by manufacturing equipment or by a manual operation.

An inner wall defining the magnet hole 14 is formed by stacking the electromagnetic steel plates that constitute the rotor core 10. Because the positions of the openings provided in the layers of the electromagnetic steel plates are slightly deviated from each other within a tolerance, the inner wall defining the magnet hole 14 is uneven. Accordingly, in the case where only the magnet 16 is inserted in the magnet hole 14, a surface of the magnet 16 may be damaged by a projected portion of the uneven inner wall. If the magnet 16 is provided with the insulating film, the film is damaged due to application of an excessive surface pressure, and as a result, an originally desired insulating function may be lost. However, in this embodiment, the magnet 16 is not provided with the insulating film, and is protected by the electromagnetic steel plate 18. The electromagnetic steel plate 18 is bonded only to each of two surfaces extending in the x-direction, among four side surfaces of the magnet 16. However, since the electromagnetic steel plate 18 includes the projected portions 18a, two surfaces extending in the y-direction are also protected. Thus, the magnet 16 does not contact the inner wall defining the magnet hole 14 during insertion. However, the electromagnetic steel plate 18 contacts the inner wall defining the magnet hole 14. Thus, there is a possibility that the insulating film in the contact portion of the electromagnetic steel plate 18 may be damaged. Even in this case, since the insulating film of the electromagnetic steel plate 18 is provided on a contact surface of the electromagnetic steel plate 18, the contact surface contacting the magnet 16, the magnet 16 and the rotor core 10 are reliably insulated from each other.

Figure 6:
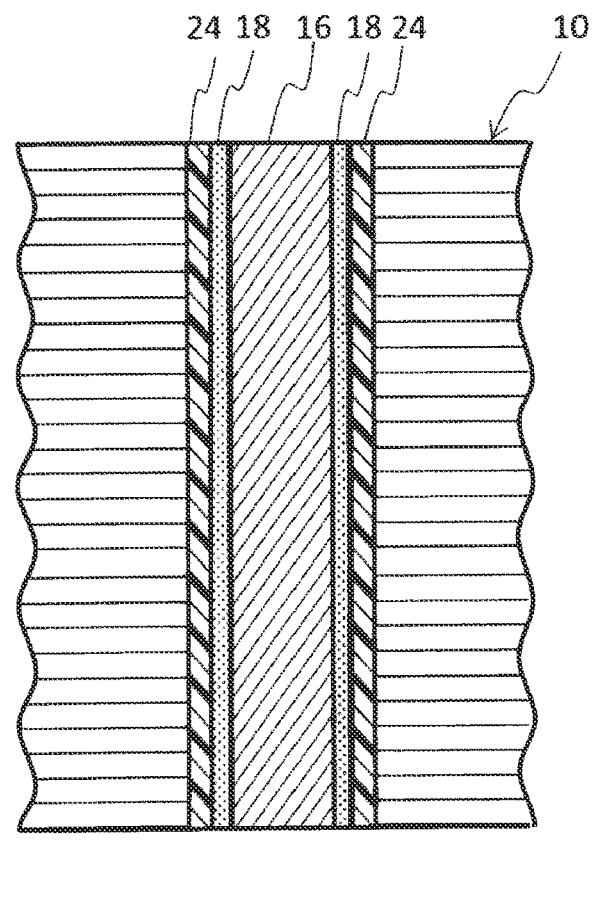
FIG. 6 is a sectional view illustrating a state where the magnet hole in which the magnet and the electromagnetic steel plates are inserted is filled with resin.

After the magnet 16 and the electromagnetic steel plates 18 are inserted in the magnet hole 14, the magnet hole 14 is filled with a filler to fix the magnet 16 and the electromagnetic steel plates 18. As the filler, a thermosetting resin as an insulating and non-magnetic material can be used. FIG. 6 is a view illustrating a state after the magnetic hole 14 is filled with the filler and is a sectional view taken along VI-VI in FIG. 5. An area between the rotor core 10 and each of the electromagnetic steel plates 18 bonded to the magnet 16 is filled with a resin 24. The resin 24 binds to the electromagnetic steel plate 18 and the rotor core 10, and is hardened. In this way, the resin 24 fixes the electromagnetic steel plates 18 and the magnet 16 so as to prevent movement of the electromagnetic steel plates 18 and the magnet 16 in the magnet hole 14.

In FIG. 6, each of the electromagnetic steel plates 18 does not contact the rotor core 10. Since the resin 24 has the insulation property, an electric current does not flow between each of the electromagnetic steel plates 18 and the rotor core 10. The insulation between the magnet 16 and the rotor core 10 is also maintained. Furthermore, even in the case where the electromagnetic steel plate 18 is tilted and fixed by the resin 24 such that the electromagnetic steel plate 18 contacts the rotor core 10, as described above, the magnet 16 and each of the electromagnetic steel plates 18 are reliably insulated from each other. Accordingly, even when a portion of the electromagnetic steel plate 18, at which the insulating film is damaged, contacts the rotor core 10, the electric current does not flow between the magnet 16 and the rotor core 10.

A description will herein be provided on an operation of the rotor in the embodiment that has been described so far. As described by using FIG. 1, the shaft is inserted in the shaft hole 12 of the rotor core 10, and thus, the rotor is formed. The magnet 16, which is bonded to the electromagnetic steel plates 18, is inserted in a specified orientation in each of the magnet holes 14 of the rotor core 10, and is then fixed by the resin 24. Around each of the magnets 16, magnetic flux flows from the surface having the N pole to the surface having the S pole. The electromagnetic steel plate 18 is bonded to each of the surface having the N pole and the surface having the S pole. Since the electromagnetic steel plate 18 is formed with the use of the highly permeable magnetic body 20 having a plate shape, the magnetic flux is hardly disturbed in comparison with a case where only the magnet 16 is inserted in the magnet hole 14. In addition, since each of the electromagnetic steel plates 18 is extremely thin, the magnet 16 and the magnet hole 14 can have the same shapes as those in the case where only the magnet 16 is inserted in the magnet hole 14. Accordingly, torque that is generated at the time of power running is substantially equal to torque that is generated at the time of power running in the case where only the magnet 16 is inserted in the magnet hole 14.

In the rotor of the rotary electric machine, the eddy current that is generated in the magnet 16 causes significant loss of electric energy. The loss of the electric energy is generally increased as a path, through which the eddy current flows, is increased. Accordingly, in a state where the electric current flows between the magnet 16 and the rotor core 10, the eddy current is increased, and the loss of the electric energy is thereby increased. However, in this embodiment, since the magnet 16 and each of the electromagnetic steel plates 18 bonded thereto are reliably insulated from each other, the electric current does not flow between the magnet 16 and the rotor core 10. Thus, the loss of the electric energy due to the magnet 16 is reduced.

The description has not been provided on a relationship between the magnet 16 that is inserted in the magnet hole 14 and each of a lower surface and an upper surface of the magnet hole 14. For example, in the case where the magnet hole 14 is closed by end plates that are provided on an upper surface and a lower surface of the rotor core 10, the magnet 16 and the rotor core 10 can be reliably insulated from each other by performing the insulating process on a contact portion of each of the end plates, the contact portion contacting the magnet 16. Alternatively, similarly to the side surface portions of the magnet 16, the magnet 16 and the end plate may be reliably insulated from each other by disposing the electromagnetic steel plate therebetween. In the case where the upper surface and the lower surface of the rotor core 10 are not closed, the rotor core 10 and the magnet 16 are reliably insulated from each other without performing a special process. A process of filling the upper surface and the lower surface of the magnet hole 14 with the resin 24 to protect the magnet 16, or the like may be performed.

In addition, in the description so far, the magnet 16 has electrical conductivity, and the surfaces thereof are not subjected to the insulating process. In this way, manufacturing cost of the magnet 16 can be reduced. However, the magnet 16 may be subjected to the insulating process of, for example, providing an insulating film on each of the surfaces.

Figure 7:
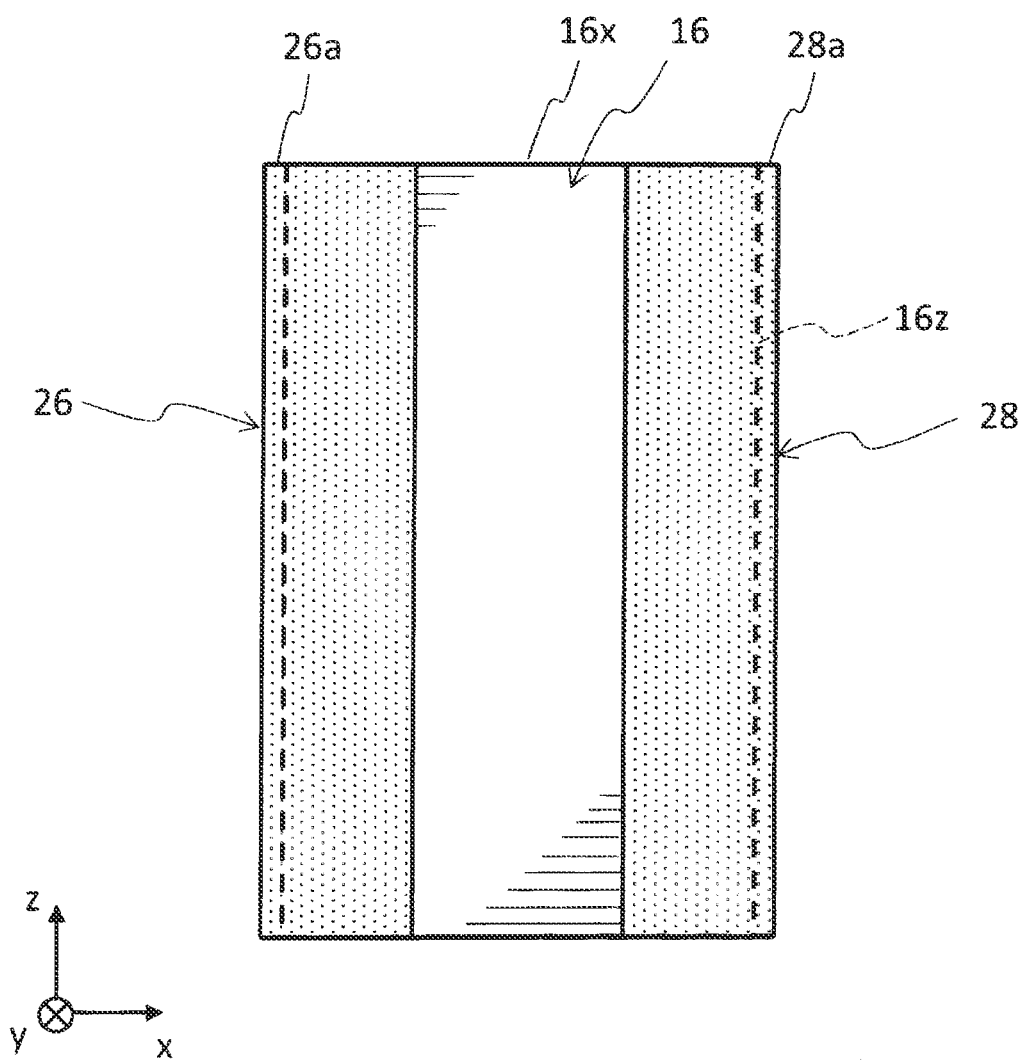
FIG. 7 is a side view illustrating a state where a magnet and a small electromagnetic steel plate according to a second embodiment are joined to each other.

A description will be provided on a second embodiment with reference to FIG. 7. In the second embodiment, the magnet 16 is inserted in the magnet hole 14 of the rotor core 10 as in the first embodiment. However, in the second embodiment, a shape of the electromagnetic steel plate that protects the magnet 16 differs from that in the first embodiment. FIG. 7 is a view illustrating the magnet 16 and small electromagnetic steel plates 26, 28 according to the second embodiment. FIG. 7 is a view that corresponds to FIG. 3. The same components will be denoted by the same reference numerals and symbols, and the description thereof will be appropriately omitted.

In an example shown in FIG. 7, instead of the electromagnetic steel plates 18 shown in FIG. 3 and the like, the two small electromagnetic steel plates 26, 28 are bonded to the magnet 16. As in the first embodiment, each of the small electromagnetic steel plates 26, 28 is a member whose opposite surfaces in the y-direction are each coated with the insulating film. The height of each of the small electromagnetic steel plates 26, 28 in the z-direction is the same as the height of the magnet 16 in the z-direction. In this point, each of the small electromagnetic steel plates 26, 28 is similar to the electromagnetic steel plate 18 in the first embodiment. The small electromagnetic steel plate 26 has a projected portion 26*a* that extends in a direction opposite to the x-direction from the width of the magnet 16, and the small electromagnetic steel plate 28 has a projected portion 28*a* that extends in the x-direction from the width of the magnet 16. Also, in this point, the small electromagnetic steel plates 26, 28 as a whole are similar to the electromagnetic steel plate 18 in the first embodiment. However, the small electromagnetic steel plates 26, 28 as a whole differ from the electromagnetic steel plate 18 in the first embodiment in that the small electromagnetic steel plates 26, 28 do not cover a center portion of the magnet 16 in the x-direction.

In the case where the magnet 16, to which the small electromagnetic steel plates 26, 28 are bonded, is inserted in the magnet hole 14, the magnet 16 does not directly contact the inner wall defining the magnet hole 14 as in the first embodiment. This is because, when the magnet 16 is inserted in the magnet hole 14, the magnet 16 is prevented from contacting the inner wall defining the magnet hole 14 in the x-direction by the projected portions 26*a*, 28*a* of the small electromagnetic steel plates 26, 28, and the magnet 16 is prevented from contacting the inner wall defining the magnet hole 14 in the y-direction by the small electromagnetic steel plates 26, 28 as a whole. In addition, even in the case where the inner wall defining the magnet hole 14 is uneven due to the tolerance of the electromagnetic steel plates, such a projected portion is formed to be linearly projected in the x-direction or the y-direction. Thus, the magnet 16 can be protected by the small electromagnetic steel plates 26, 28.

In this embodiment, the two small electromagnetic steel plates 26, 28 need to be bonded to each of the two surfaces of the magnet 16, the two surfaces extending in the x-direction. Each of the small electromagnetic steel plates 26, 28 is provided only near a corner of the magnet 16 such that the small electromagnetic steel plates 26, 28 do not overlap each other. Thus, the magnet 16 can be protected by a smaller area, as a whole, than an area protecting the magnet 16 in the first embodiment. In addition, because each of the small electromagnetic steel plates 26, 28 is formed with the use of a thin magnetic body having a plate shape, the disturbance of the magnetic flux, which is caused by coexistence of portions provided with the small electromagnetic steel plates 26, 28 and portions not provided therewith, is small. Thus, an influence of the disturbance of the magnetic flux on output torque is also small.

Figure 8:
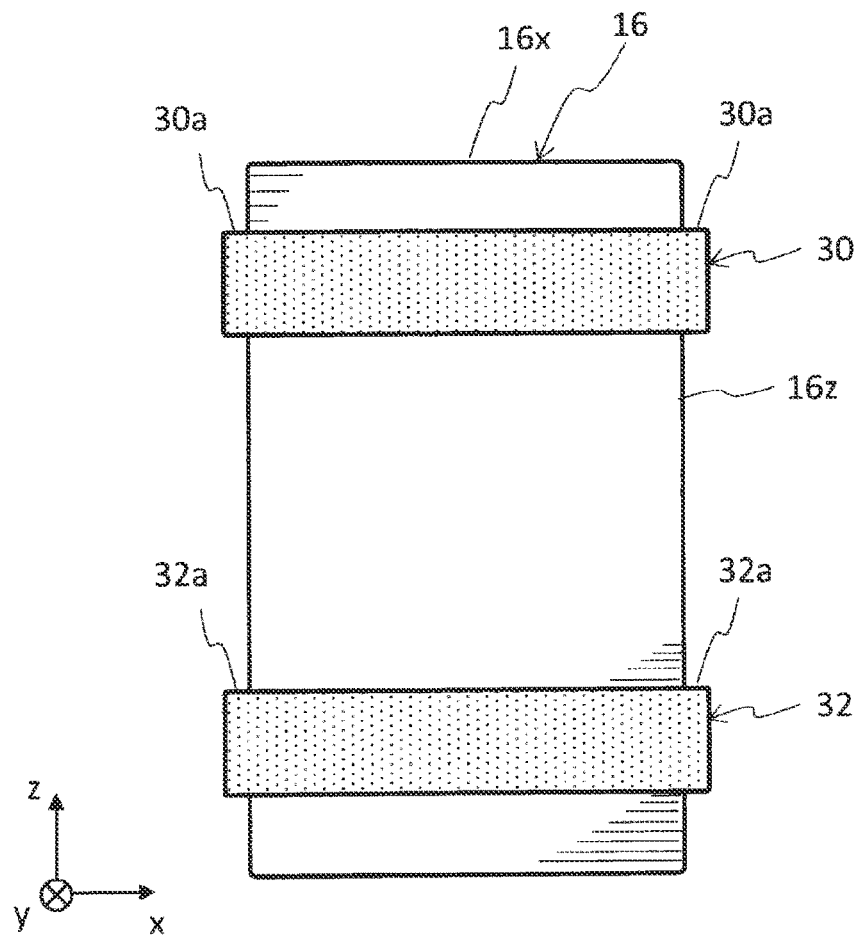
FIG. 8 is a side view illustrating a state where a magnet and a small electromagnetic steel plate according to a third embodiment are joined to each other.

A description will be provided on a third embodiment with reference to FIG. 8. The third embodiment is the same as the first embodiment and the second embodiment in that the magnet 16 is inserted in the magnet hole 14 of the rotor core 10. However, a shape of each electromagnetic steel plate that protects the magnet 16 in the third embodiment differs from that in each of the first embodiment and the second embodiment. FIG. 8 is a view illustrating the magnet 16 and small electromagnetic steel plates 30, 32 according to the third embodiment. FIG. 8 is a view that corresponds to FIG. 3 or FIG. 7. The same components will be denoted by the same reference numerals and symbols, and the description thereof will be appropriately omitted.

In an example shown in FIG. 8, the two small electromagnetic steel plates 30, 32 are bonded to the magnet 16. The small electromagnetic steel plates 26, 28 used in the second embodiment are each formed to have the same height as the height of the magnet 16 in the z-direction and to be narrower than the magnet 16 in the x-direction. In contrast, the small electromagnetic steel plates 30, 32 shown in FIG. 8 are formed to be wider than the magnet 16 in the x-direction and are respectively provided with projected portions 30a, 32a located outside both ends of the width of the magnet 16. The small electromagnetic steel plates 30, 32 differ from the electromagnetic steel plates in the above-described embodiments in that the small electromagnetic steel plates 30, 32 do not overlap each other in the z-direction and that the small electromagnetic steel plates 30, 32 cover only portions of the magnet 16 near an upper end and a lower end of the magnet 16, respectively. More specifically, in the case where a position in the magnet 16 in the z-direction is indicated such that the lowermost end thereof is 0 and the uppermost end is 1, the small electromagnetic steel plate 30 covers the portion of the magnet 16 near the position of 0.8 to 0.9, and the small electromagnetic steel plate 32 covers the portion of the magnet 16 near the position of 0.1 to 0.2.

In the case where the magnet 16, to which the small electromagnetic steel plates 30, 32 are bonded, is inserted in the magnet hole 14, the contact between magnet 16 and the inner wall defining the magnet hole 14 is avoided unless the magnet 16 is significantly tilted. Within a small tilt range, the projected portions 30a, 32a of the small electromagnetic steel plates 30, 32 prevent the magnet 16 from contacting the inner wall defining the magnet hole 14 in the x-direction, and the small electromagnetic steel plates 30, 32 as a whole prevent the magnet 16 from contacting the inner wall defining the magnet hole 14 in the y-direction. Note that, in the case where the inner wall defining the magnet hole 14 is uneven due to the tolerance of the electromagnetic steel plates, there is a possibility that the projected portion may directly contact the magnet 16. Accordingly, in this embodiment, the projected length of each of the projected portions 30a, 32a of the small electromagnetic steel plates 30, 32 is set to be longer than the tolerance of the projected length of the projected portion in the inner wall defining the magnet hole 14. Thus, the small electromagnetic steel plates 30, 32 prevent the magnet 16 from contacting the projected portion in the inner wall defining the magnet hole 14 in the x-direction. In addition, the thickness of each of the projected portions 30a, 32a of the small electromagnetic steel plates 30, 32 is set to be greater than the tolerance of the projected length of the projected portion. Thus, the small electromagnetic steel plates 30, 32 prevent the magnet 16 from contacting the projected portion in the inner wall defining the magnet hole 14 in the y-direction.

In this embodiment, similarly to the second embodiment, the two small electromagnetic steel plates 30, 32 are bonded to each of the two surfaces of the magnet 16, the two surfaces extending in the x-direction. Just as described, since each surface of the magnet 16 extending in the x-direction is covered with two, three, or more small electromagnetic steel plates such that the small electromagnetic steel plates do not overlap each other, the magnet 16 can be protected. In the case where the small electromagnetic steel plates are disposed, a disposition position, the shape, the projected length, the thickness, and the like thereof are set such that the magnet 16 does not contact the inner wall (including the projected portion in the uneven inner wall) of the magnet hole 14 even when the magnet 16 is slightly tilted.

Figure 9:
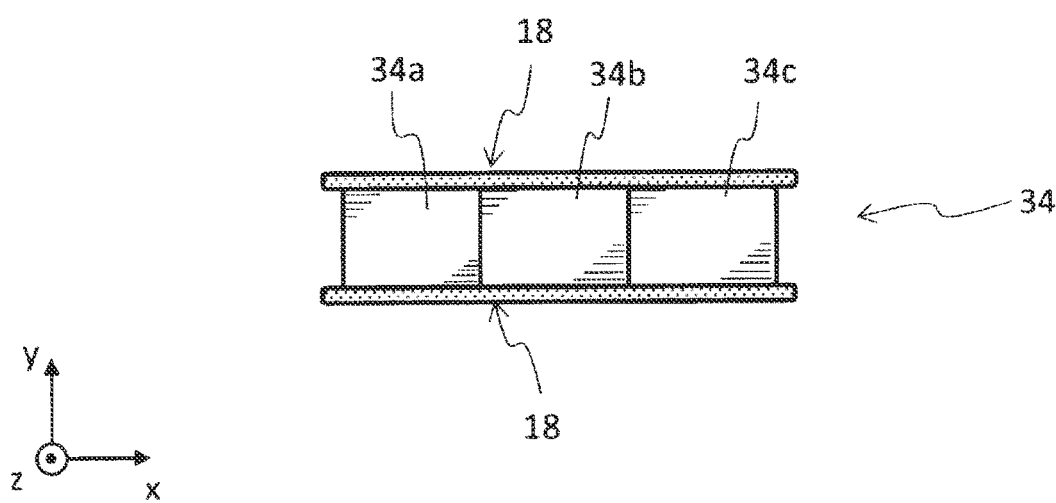
FIG. 9 is a top view illustrating a state where a small magnet and an electromagnetic steel plate according to a fourth embodiment are joined to each other.

A description will be provided on a fourth embodiment with reference to FIG. 9. The fourth embodiment differs from the first embodiment in that the magnet inserted in the magnet hole 14 of the rotor core 10 is formed by a plurality of small magnets (in other words, the magnet inserted in the magnet hole 14 includes the plurality of small magnets). However, the fourth embodiment is the same as the first embodiment in that the electromagnetic steel plate 18 is used to protect the magnet. FIG. 9 is a view illustrating a magnet 34 and the electromagnetic steel plates 18 according to the fourth embodiment. FIG. 9 is a view that corresponds to FIG. 2. The same components will be denoted by the same reference numerals and symbols, and the description thereof will be appropriately omitted.

In an example shown in FIG. 9, the magnet 34 includes three small magnets 34a, 34b, 34c. The small magnets 34a, 34b, 34c correspond to magnets obtained when the magnet 34 is divided into three in the x-direction and is not divided in the y-direction and the z-direction. Each of these small magnets 34a, 34b, 34c is magnetized in one direction that is the y-direction, and the small magnets 34a, 34b, 34c as a whole have substantially the same magnetic force as the magnetic force of the magnet 16 in the first embodiment. Each of the small magnets 34a, 34b, 34c has opposite surfaces in the y-direction that are bonded to the electromagnetic steel plates 18, and a position of each of the small magnets 34a, 34b, 34c is thus fixed. Accordingly, when the electromagnetic steel plates 18 and the small magnets 34a, 34b, 34c are inserted in the magnet hole 14, the small magnets 34a, 34b, 34c can be handled as the single large magnet 34.

In this embodiment, similarly to the first embodiment, the electromagnetic steel plates 18 prevent the magnet 34 from contacting the inner wall defining the magnet hole 14. In the case where the magnet 34 includes the plurality of small magnets 34a, 34b, 34c, the flow of the eddy current is restricted, and thus the loss of the electric energy in the magnet 34 can be prevented. In particular, in the case where the small magnets 34a, 34b, 34c are subjected to the insulating process such as insulation coating to prevent the flow of the electric current among the small magnets 34a, 34b, 34c, the flow of the eddy current can be limited within each of the small magnets 34a, 34b, 34c. Furthermore, the small magnets 34a, 34b, 34c are bonded to the electromagnetic steel plates 18 and are integrated, and the small magnets 34a, 34b, 34c can be inserted in the magnet hole 14 without considering damage to the insulation coating. Thus, as compared to a case where the small magnets 34a, 34b, 34c are individually inserted in the magnet hole 14, an insertion process can be easily performed.

Figure 10:
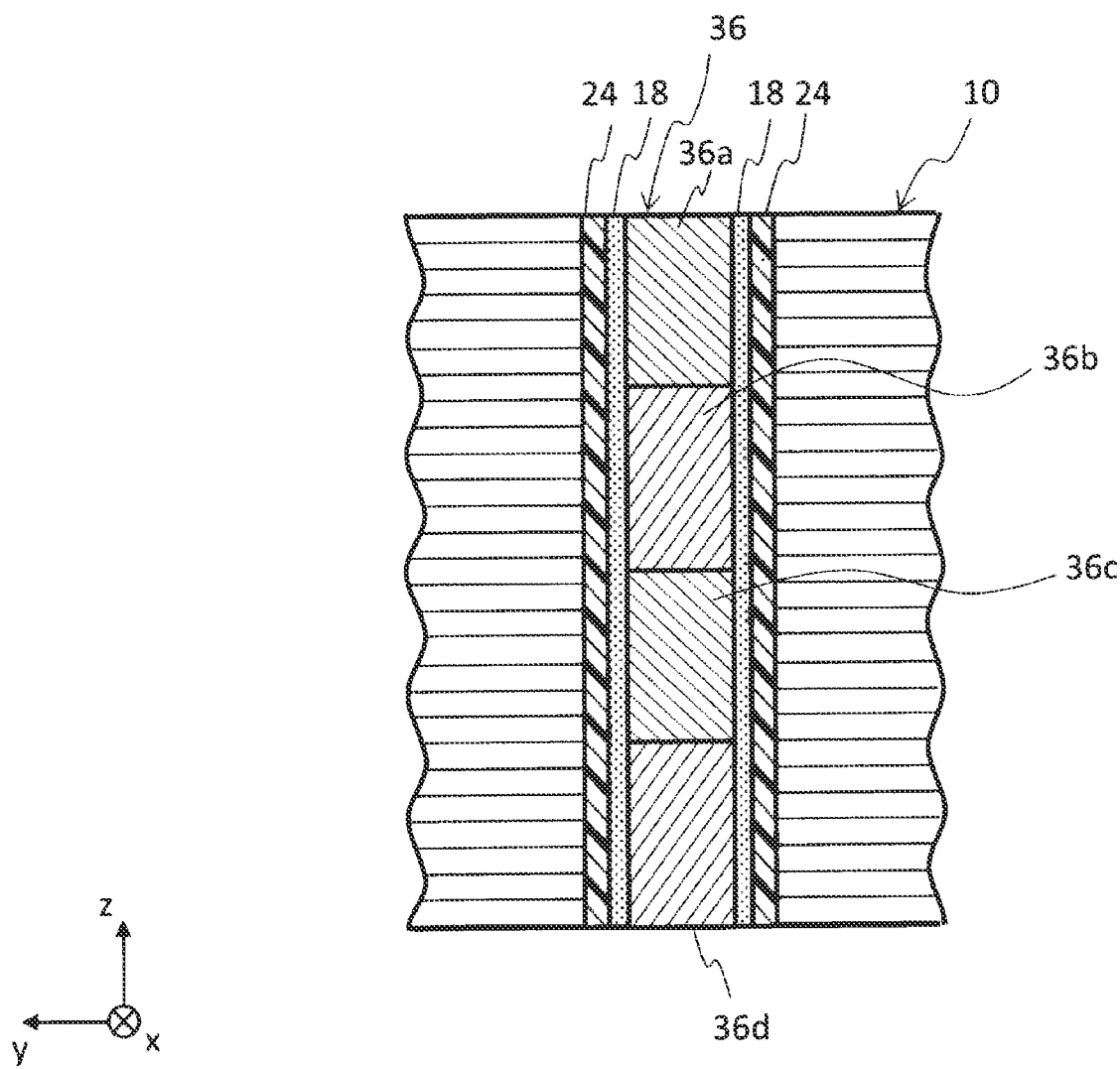
FIG. 10 is a sectional view illustrating a state where small magnets and electromagnetic steel plates according to a fifth embodiment are inserted in a magnet hole and the magnet hole is filled with resin.

A description will be provided on a fifth embodiment with reference to FIG. 10. The fifth embodiment is similar to the fourth embodiment in that the magnet inserted in the magnet hole 14 of the rotor core 10 includes a plurality of small magnets and each of the small magnets is protected by the electromagnetic steel plates 18. However, the fifth embodiment differs from the fourth embodiment in that the small magnets are arranged in the z-direction while the small magnets are arranged in the x-direction in the fourth embodiment. FIG. 10 is a view that corresponds to FIG. 6. The same components will be denoted by the same reference numerals and symbols, and the description thereof will be appropriately omitted.

In an example shown in FIG. 10, a magnet 36 includes small magnets 36a, 36b, 36c, 36d. The small magnets 36a, 36b, 36c, 36d correspond to the magnets obtained when the magnet 36 is divided into four in the z-direction and is not divided in the x-direction and the y-direction. Each of the small magnets 36a, 36b, 36c, 36d is magnetized in one direction that is the y-direction, and the small magnets 36a, 36b, 36c, 36d as a whole have substantially the same magnetic force as the magnetic force of the magnet 16 in the first embodiment. Each of the small magnets 36a, 36b, 36c, 36d has opposite surfaces in the y-direction that are bonded to the electromagnetic steel plates 18, and the small magnets 36a, 36b, 36c, 36d are thus integrated. Then, the small magnets 36a, 36b, 36c, 36d are inserted in the magnet hole 14. Thereafter, the small magnets 36a, 36b, 36c, 36d and the electromagnetic steel plates 18 are fixed in the magnet hole 14 by the resin 24. In this point, the fifth embodiment is similar to the first embodiment.

In this embodiment, similarly to the fourth embodiment, the loss of the electric energy in the magnet 36 can be prevented by using the small magnets 36a, 36b, 36c, 36d. In addition, similarly to the fourth embodiment, the insertion process is simplified by adhering the small magnets 36a, 36b, 36c, 36d to the electromagnetic steel plates 18. The plurality of small magnets can be arranged in various manners other than those described in this embodiment and the fourth embodiment. As an example, the plurality of small magnets may be arranged in both of the x-direction and the z-direction.

The plurality of small magnets can be protected by the plurality of small electromagnetic steel plates as described in the second embodiment and the third embodiment. In the case where the plurality of small electromagnetic steel plates are used, each of the small electromagnetic steel plates is set to have a shape that allows adhesion to and integration with the small magnet. In this way, an insertion process of the small magnets and the small electromagnetic steel plates can be easily performed.

What is claimed is:

1. A rotor comprising:
   a rotor core that is formed by stacking a plurality of steel plates each of which has an opening;
   a magnet that is inserted in a magnet hole formed by disposing the openings such that the openings overlap each other; and
   a magnetic plate that is disposed between an inner wall defining the magnet hole and the magnet so as to prevent contact between the inner wall defining the magnet hole and the magnet, wherein
   at least a contact portion of the magnetic plate is subjected to an insulating process, the contact portion of the magnetic plate contacting the magnet.

2. The rotor according to claim 1, wherein at least a surface of the magnet has electrical conductivity.

3. The rotor according to claim 1, wherein the magnetic plate is joined to the magnet.

4. The rotor according to claim 3, wherein the magnet includes a plurality of small magnets combined with each other, and the plurality of small magnets are joined to the magnetic plate.

5. The rotor according to claim 3, wherein:
   the magnetic plate that is disposed on a surface of the magnet includes a plurality of small magnetic plates, the surface extending in a surface plane, the plurality of small magnetic plates disposed such that the plurality of small magnetic plates do not overlap each other when viewed in a direction perpendicular to the surface plane; and
   the plurality of small magnetic plates are joined to the magnet.

6. The rotor according to claim 1, wherein:
   each of the magnet and the magnet hole has a rectangular parallelepiped shape; and
   the magnetic plate that is disposed on a surface of the magnet extends outward from a width of the magnet.

* * * * *

UNITED STATES PATENT AND TRADEMARK OFFICE
CERTIFICATE OF CORRECTION

PATENT NO. : 10,707,709 B2
APPLICATION NO. : 16/209305
DATED : July 7, 2020
INVENTOR(S) : Hiroyuki Hattori and Ken Noda Page 1 of 1

It is certified that error appears in the above-identified patent and that said Letters Patent is hereby corrected as shown below:

On the Title Page

Item (72), inventor 1, city, delete "Okazaki" and insert --Okazaki-shi Aichi-ken--, therefor.

Item (72), inventor 2, city, delete "Nagoya" and insert --Nagoya-shi Aichi-ken--, therefor.

Signed and Sealed this
Thirteenth Day of October, 2020

Andrei Iancu
*Director of the United States Patent and Trademark Office*